United States Patent
Wildhaber

[15] 3,663,802

[45] May 16, 1972

[54] RECORD FOR MACHINE SCANNING

[72] Inventor: Ernest Wildhaber, 124 Summit Drive, Rochester, N.Y. 14620

[22] Filed: Mar. 9, 1970

[21] Appl. No.: 17,791

[52] U.S. Cl. ........... 235/61.12 N, 340/146.3 K, 235/61.12 M

[51] Int. Cl. ..................... G06k 7/10, G06k 7/08, G06k 9/02

[58] Field of Search ............... 235/61.12 R, 61.115, 61.11 R, 235/61.7 B, 61.12 M, 61.12 N; 340/149 A, 146.3 K

[56] References Cited

UNITED STATES PATENTS

| | | | |
|---|---|---|---|
| 3,283,303 | 11/1966 | Cerf | 235/61.12 |
| 3,044,696 | 7/1962 | Feissel | 235/61.12 |
| 3,409,760 | 11/1968 | Hamish | 235/61.12 |
| 3,211,470 | 10/1965 | Wilson | 235/61.12 |
| 3,502,851 | 3/1970 | Kakimoto | 235/61.12 |
| 3,527,927 | 9/1970 | Bijleveld | 235/61.11 E |
| R23,385 | 7/1951 | Knutsen | 235/61.12 |
| 2,963,220 | 12/1960 | Kosten | 235/61.12 |
| 3,220,301 | 11/1965 | Koonz | 235/61.12 |
| 3,257,545 | 6/1966 | Van Berkel | 235/61.12 |

*Primary Examiner*—Maynard R. Wilbur
*Assistant Examiner*—Robert M. Kilgore
*Attorney*—Shlesinger, Fitzsimmons and Shlesinger

[57] ABSTRACT

The characters of this record are made up of varying numbers of straight bars placed side by side. The bars are in positions selected among equally spaced bar positions. They are arranged in a binary code and bars in alternate positions in the character space may be displaced heightwise with respect to the other bars for further distinction.

6 Claims, 13 Drawing Figures

INVENTOR:

Ernest Wildhaber

RECORD FOR MACHINE SCANNING

The present invention relates to records for optical and other machine scanning. It is used for transmission by electric current fluctuations for instance to a computer, to tape, or to a distant point.

One object of the invention is to provide a record that can be scanned and transmitted with very simple means at a high speed rate and with great reliability. A further object is to devise a practical record for the "Optical Scanning Apparatus" described in my companion application filed on even date herewith, Ser. No. 17,792.

Another aim is to provide a record bearing simplified characters easily read by machine, by dropping the requirement that these be readily readable by novices.

Other aims will appear in the course of the specification and in the recital of the appended claims. In the drawings:

FIGS. 1 to 4 show an enlarged character space of a record and illustrate various modifications of bars thereon. The shown bars differ in width and in their positions heightwise of the character space.

FIGS. 5 and 6 together illustrate one way of making up the letters A to Z with bars according to FIG. 2.

FIG. 7 shows a way of making up numerals with bars according to FIG. 3.

FIG. 8 spells out the word EUREKA.

FIG. 9 describes a modification. It shows an enlarged character space of a record and a portion of an adjacent character space. The bars run here in the direction of the line of characters.

FIGS. 10 to 13 relate to records where scanning is confined to numerals.

Figure 1:
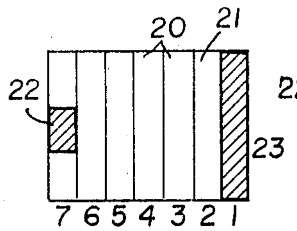
Figure 2:
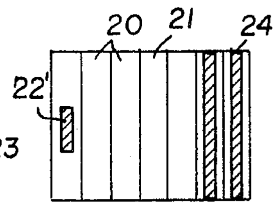
Figure 3:
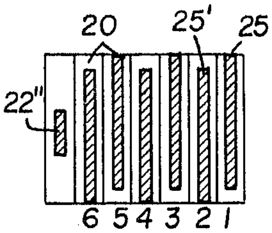
Figure 4:
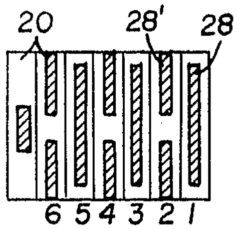

FIGS. 1 to 4 have their character space 20 subdivided into a plurality of equal narrow and upright spaces or partitions 21 that may number from 4 to 9. They are marked 1 to 7 in FIG. 1. Partition No. 7 contains a fixed mark common to all characters in all four Figures. It is denoted at 22 in FIG. 1; 22′, 22″ in FIGS. 2 and 3 respectively. It signifies the start of a character. Its length differs from that of the bars, so as to produce an electric pulse of different magnitude. Each of the four FIGS. 1 to 4 has bars of constant width in the character spaces. Bar 23 of FIG. 1 completely fills the width of its allotted partition, as do all the bars based on the showing of FIG. 1. FIGS. 2 to 4 show narrower bars, preferably less than half the width of the partitions, all centered in their partitions. The bars 24 (FIG. 2) have all a constant length like the two bars shown. Characters are made up by varying the number of bars in the character space and the bar position. The positions are selected among equally spaced bar positions. The characters themselves are assigned to equal character spaces along a line.

Figure 5:
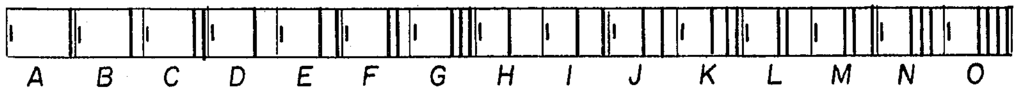
Figures 6, 7, 9:
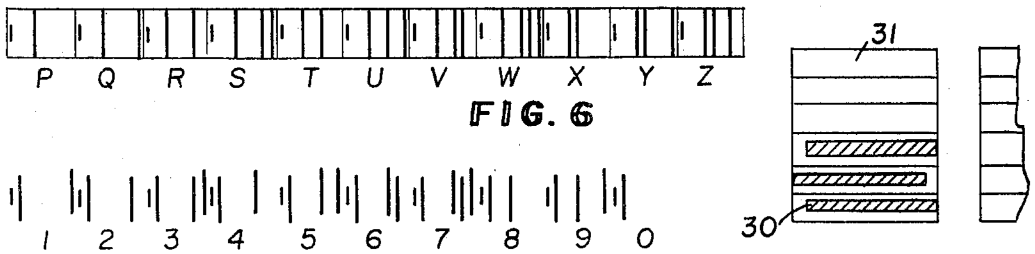

FIGS. 5 and 6 show an example of making up the letters A to Z with bars of the type shown in FIG. 2. The boundaries of the character spaces are also shown. The spacing between every two immediately adjacent bars is constant.

Figure 8:

FIGS. 3 and 4 show bars placed in each partition of the character space. The bars 25, 25′ shown in FIG. 3 have all equal length, but alternate bars at 1, 3, 5 are displaced heightwise with respect to the other bars at 2, 4, 6, to reach up higher. Thus the bars differ not merely in their lateral position, but alternately also in the height position. This added distinction facilitates personal reading. FIG. 7 illustrates one way of making up numerals 0 to 9 based on the bars shown in FIG. 3. Here the space boundaries have been omitted. FIG. 8 spells out the word EUREKA in this manner.

The bars in the letters A to I (FIG. 5) spell out the numbers 1 to 9 in binary language. The numerals 1 to 9 (FIG. 7) contain bars of identicaL lateral position, to which is added a bar in position 6. Only a portion of the possible bar combinations have been shown here. Other combinations may be used for signs or symbols.

The modification shown in FIG. 4 uses single bars 28 and split bars 28′. The split bars in alternate positions 2, 4, 6 have a larger overall length than the single bars in the positions 1, 3, 5. But their accumulated length is the same. The two bar halves, if joined together, have the same length as the single bars 28. As in FIG. 3, this provides an added distinction between adjacent bar positions.

The modification shown in FIG. 9 has bars 30 that extend in the direction of the line of characters. This permits to use character spaces 31 that are higher than wide. This is a more conventional configuration than that of the character spaces 20 (FIGS. 1 to 4) which are preferably wider than high when six or more bar partitions are used in a character space. The modification of FIG. 9 however requires a more complex scanner, as for instance one as described in my application entitled "Optical Scanning Disposition" filed Jan. 24, 1969, Ser. No. 793,851.

It should also be understood that the present invention is not confined to the named scanner for which an application has been filed on even date herewith.

In many cases the characters are confined to numerals. Also it is often desirable that the numerals to be scanned can be put down by hand in an exact way.

FIGS. 10 to 13 relate to such cases. Here it is sufficient to use four bar positions in a character space. All possible bar positions are lightly marked by lines on the record sheet. The bars actually used in the character spaces are put in by hand along and following selected one of these lines.

Figure 10:
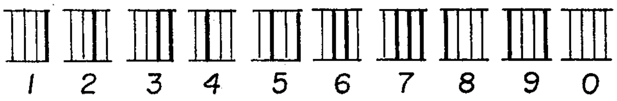
FIG. 10 illustrates one way of making up the numerals 0 to 9, in a manner adapted for application by hand.
Figure 11:
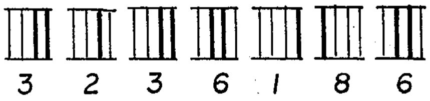
FIG. 11 shows a number made up with such numerals.

In the embodiment to be described with FIGS. 10 and 11 the said lightly marked lines are in a color invisible to the scanner. FIG. 10 shows the numerals 0 to 9 in this manner, it being understood that the thin lines represent lines invisible to the scanner. FIG. 11 shows a number put down this way. Only the heavy lines count for scanning. The first bar at the right of the character space stands for 1; the bar in the second partition stands for 2; the one in the third partition for 4; the one in the fourth partition for 8. The number of the numeral is the sum of the bar values therein. Thus numeral 5 is defined by two bars valued 4 and 1. Such numerals are simpler than Roman numerals and also simpler than the conventional Arabic numerals of the decimal system. They are easily and accurately applicable by hand by following selected lines that are marked on the record sheet. Though they are less familiar they are readily learned.

Figure 12:
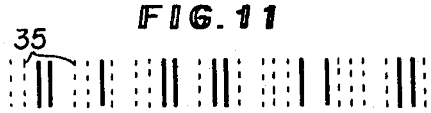
FIG. 12 illustrates a modified way of making up this number.
Figure 13:
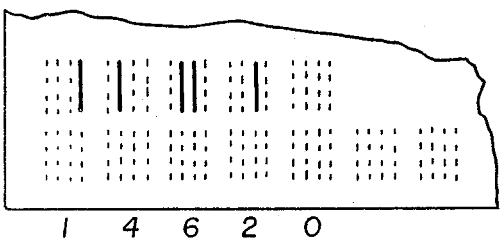
FIG. 13 is a view of a record portion bearing a postal zone number and possible further information.

In FIGS. 12 and 13 the marking lines 35, along which the bars are to be selectively applied, are shown as dotted lines. Special color printing is then avoided. These dotted lines may be marked in black. They are much lighter overall than the bars to be applied.

FIG. 12 shows the same number as FIG. 11. It could be a patent number for ordering patent copies. The upper line of FIG. 13 shows my Zip code number 14620. The simplicity of marking and of reading is outstanding. Eventually the post-office may need some further information on the lower line, that is machine readable, so that the sorting in the branch post-office can be done by machine entirely.

Inasmuch as letter characters of the type described take longer to learn, these are preferably accompanied by conventional characters for the time being and the near future.

For definition of the scope of the invention reliance is had on the appended claims.

I claim:

1. A record for machine scanning by an optical scanner comprising a plurality of bars arranged in spaces of uniform width which are disposed side by side in a line, the number and height positions of the bars in a space corresponding to the character represented by the bars in that space, so that different characters are represented by different numbers of bars differently positioned heightwise in different spaces, all said bars being of the same length, and the heightwise displacement of a bar relative to other bars being less than one-fifth the bar length.

2. A record according to claim 1 whereon said equally spaced bar positions are spaced apart less than one third of the height of said character spaces and the accumulated bar length is approximately constant for all bar positions.

3. A record according to claim 1, whereon each character also contains a mark of fixed position and fixed length differing from the length of said bars.

4. A record according to claim 1, whereon said bars have a constant length and extend continuously from one bar end to the other.

5. A record according to claim 1, whereon said marks are approximately perpendicular to the line along which said characters are arranged.

6. A record according to claim 1, whereon said bars are approximately parallel to said line.

* * * * *